(12) United States Patent
Kübel

(10) Patent No.: US 8,191,582 B2
(45) Date of Patent: Jun. 5, 2012

(54) HOSE

(76) Inventor: Johann Kübel, Kasten (AT)

( * ) Notice: Subject to any disclaimer, the term of this patent is extended or adjusted under 35 U.S.C. 154(b) by 476 days.

(21) Appl. No.: 12/466,015

(22) Filed: May 14, 2009

(65) Prior Publication Data

US 2010/0288392 A1 Nov. 18, 2010

(51) Int. Cl.
*F16L 9/14* (2006.01)
*F16L 55/10* (2006.01)

(52) U.S. Cl. ......... 138/153; 138/174; 138/96; 428/36.4; 156/275.5

(58) Field of Classification Search .................. 138/153, 138/174, 98, 114; 428/36.4; 156/275.5
See application file for complete search history.

(56) References Cited

U.S. PATENT DOCUMENTS

| | | | | |
|---|---|---|---|---|
| 4,131,701 A | * | 12/1978 | VanAuken | 138/143 |
| 4,241,763 A | * | 12/1980 | Antal et al. | 138/127 |
| 4,260,445 A | * | 4/1981 | Mayumi et al. | 156/276 |
| 4,786,536 A | * | 11/1988 | Kaempen | 428/36.3 |
| 6,485,834 B1 | | 11/2002 | Mariaggi et al. | 428/498 |
| 6,586,110 B1 | * | 7/2003 | Obeshaw | 428/593 |
| 6,824,847 B2 | | 11/2004 | Mariaggi et al. | 428/36.9 |
| 2002/0058121 A1 | | 5/2002 | Mercier | 428/94 |

FOREIGN PATENT DOCUMENTS

| | | |
|---|---|---|
| DE | 19620489 A1 | 11/1997 |
| EP | 1125965 A1 | 8/2001 |

* cited by examiner

*Primary Examiner* — Patrick F Brinson
(74) *Attorney, Agent, or Firm* — Laurence A. Greenberg; Werner H. Stemer; Ralph E. Locher

(57) ABSTRACT

The invention relates to a hose with a tubular casing formed with a resin, preferably vinyl ester or polyester, as well as a method for using same. Cut-to-length glass fiber tubes are embedded in the resin forming the hose, and the length of the glass fiber tubes on both surfaces of the hose have values which are preset and different from one another.

43 Claims, 4 Drawing Sheets

HOSE

BACKGROUND OF THE INVENTION

Field of the Invention

The invention relates to a hose with a tubular casing formed with a resin, in particular UV hardenable resin, preferably vinyl ester or polyester and to a method for inserting a pipe insert into the discharge region of two pipes, namely a pipe and a further pipe, which opens into the pipe.

Hoses of this type are used or required, in particular, for clearing waste water in pipes.

A hose is understood to be a hollow body with two openings, wherein essentially a longitudinal direction is given. In sections perpendicular to this longitudinal direction, the hose has a largely uniform, circular cross section, in particular with geometrically similar sectional areas. Due to the great flexibility of the hose according to the invention, the shape can of course also deviate from the circular shape and be more or less brought into the shape of an elliptical ring or a rectangular ring.

In particular, this is the case in hoses which are hardened and adapted to a given pipe. In the following, hollow cones and hollow cylinders are understood to be those having any cross section desired, i.e. for example also elliptical hollow cones and elliptical hollow cylinders.

In particular, the hose has the form of a hollow truncated cone or a hollow cylinder. The wall thickness is preferably constant over the entire hose, independent of the sectional area. The hose can also be formed as a composite geometric body which consists of a plurality of hollow truncated cones, also with various diameters and inclines, and/or hollow cylinders. The incline and/or the diameter of a hollow conical hose can also vary continuously, as a result of which a geometrically smooth and/or kink-free surface is produced.

A form which expands, in its diameter, especially with a constant wall thickness with increasing incline, i.e. bent outward, in particular in a trumpet-shaped manner is described as a scoop or brim-shaped form. The walls of the scoop extend almost parallel or only slightly expanding to the longitudinal direction in their one end region. In the opposite end region, the walls of the scoop extend almost at a right angle, i.e. with a very great incline, to the longitudinal direction.

A fundamental disadvantage of hoses according to the prior art is that, due to the material-related shrinkage of the hose during hardening, it can often only be adapted to the given pipe with great pressure and results in rejections or separations, in particular, in hoses or liners having large expansions due to the shrinkage of the hose.

BRIEF SUMMARY OF THE INVENTION

The object of the invention is to solve the aforementioned problems and to create a hose which can be easily and cost-effectively produced, which can be easily adapted in its form to an existing pipe configuration, adheres well to it, and accurately fits against the inner surface of the pipe to be lined, and exhibits great stability.

The invention solves the object with the features of the characterizing part of claim 1.

A fundamental advantage of a hose according to the invention is that the hose can be easily adapted to the pipe surrounding it and, after hardening, accurately fit against or on the surface of the pipe. Due to the property of the UV hardening, the hose can be inserted into the pipe region in a short period of time, the pipe region acted upon with the hose merely being interrupted for a few minutes. The small glass fiber tubes effectively prevent shrinkage of the hose attached to the inner surface of the pipe in the expanded state.

The stresses occurring inside the hose can be reduced with the features of claim 2.

A hose according to claim 3 can be inserted into a pipe especially easily and offers a constant stability over its periphery. A hose according to claim 4 has improved adhesive properties on the inner side of a pipe and does not shrink.

A hose according to claim 5 is especially stable and prevents clogging of the pipe section in which the hose is inserted. In contrast to hoses according to the prior art, a hose with these features is free of seams and overlapping areas. As a result, an age-related destruction of the seams is for the most part avoided.

The features of claim 6 enable the formation of smooth surfaces when several hoses are joined together.

The insertion of a hose into a pipe can be facilitated with the features of claim 7. Furthermore, the features of claim 7 prevent the destruction of the hose during insertion into the pipe.

A hose according to claim 8 can be especially easily adapted to the inner surface of a pipe.

T and Y pipe inserts can be formed with a hose or a scoop according to claim 9.

With the features of claim 10, the structure of a T-shaped or Y-shaped pipe insert is reinforced in the area of the connection of these elements and a stable connection or lining obtained.

The adhesion of the r-shaped pipe insert to the further pipe opening into the main pipe is improved with the features of claim 11.

A pipe insert according to claim 12 is especially easy to produce. Furthermore, the features of claim 12 prevent mechanical stresses in the transitional areas.

The features of claim 13 improve the adhesion of a T-shaped pipe insert inside a pipe branch.

The production of a T-shaped or Y-shaped pipe inserts is simplified with the features of claim 14. Furthermore, an improved pliability and an improved adaptability is produced in the area of insertion of the further pipe into the main pipe.

A pipe insert according to claim 15 or 16 is especially easy to produce.

An improved adaptation of the pipe insert or of the hose to a pipe, in particular in the discharge region, is produced with the features of claim 17. Furthermore, an improved adaptation of a T-shaped or Y-shaped hose to a T-shaped or Y-shaped pipe opening is produced.

Pipe inserts with thin wall thicknesses can be produced with the feature of claim 18.

A pipe insert according to claim 19 is especially inherently stable in the hardened state.

The stability of the pipe insert is increased with the features of claim 20.

The features of claim 21 reduce the material deformations or shrinkage of a pipe insert during hardening.

A pipe insert having the features of claims 22 and 23 has especially high tensile strength in relation to the forces acting along the periphery of the pipe.

The features of claim 24 increase the stability of a hardened pipe insert to torsion and to axial stresses.

The production of a pipe insert is simplified and an especially good adaptation of the pipe insert to a pipe made possible with the features of claims 25 and 26.

The pipe insert can be hardened especially easily, quickly and reliably with the features of claim 27.

The penetration of liquid media from the outside in the area of damaged spots is prevented to the greatest extent possible in a pipe having a pipe insert with the features of claims 28 and 29.

A pipe insert can be quickly and easily inserted into a pipe with a method according to claim 30.

An especially good adaptation of the pipe insert to the pipe is possible with the features of claim 31.

The positioning of the pipe insert in the pipe is simplified with the features of claim 32, in pipe branches, they can be easily found and sealed.

DESCRIPTION OF THE INVENTION

Figure 1:
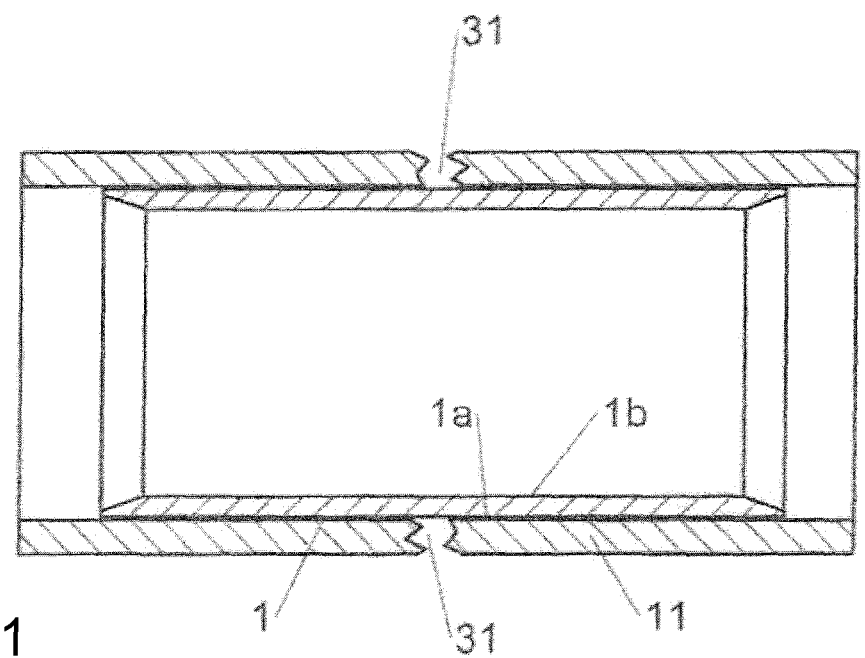
FIG. 1 schematically shows a sectional view of a pipe with inserted hose.

FIG. 1 shows a partial area of a pipeline or a pipe 11 which has a damaged spot 31 on its upper side or its lower side. To prevent fluids being conveyed through the pipe 11 from flowing out or to seal the pipe 11, a plastic hose or hose 1 is inserted in the area of the damaged spot 31.

A hose 1 is a hose formed with resin 3, in particular a UV-hardenable resin, which at first has a viscous to elastically deformable, soft consistency. By hardening the hose 1 by means of illumination with UV radiation, the hose 1 shrinks which affects the fit accuracy of the hose 1. The mass forming the hose 1 comprises a web-like structure with small glass fiber tubes 2 (tubelets) which are embedded in the resin 3 of the hose 1, as well as this resin 3. The hose has a uniform thickness over its periphery and its longitudinal extension.

The essential advantage of a hose 1 according to the invention in comparison to a hose 1 according to the prior art is in that the length of the small glass fiber tubes 2 inserted into the hose 1 is varied over the thickness of the wall of the hose 1 and the longer glass fiber tubes lie in that area which is in contact with the object to be sealed. In this case, the longer glass fiber tubes 2 adjoin the outer casing of the hose 1.

The hose 1 can be inverted; in this case, the shorter glass fiber tubes 2 adjoin the outer surface. However, for insertion into a pipe, only the configuration in which the longer glass fiber tubes 2 adjoin on the outside is required. Therefore, the hose 1 must again be brought into this configuration prior to insertion. The surface to which the longer glass fiber tubes 2 adjoin is brought into contact with the inner surface of the pipe.

Figure 2:
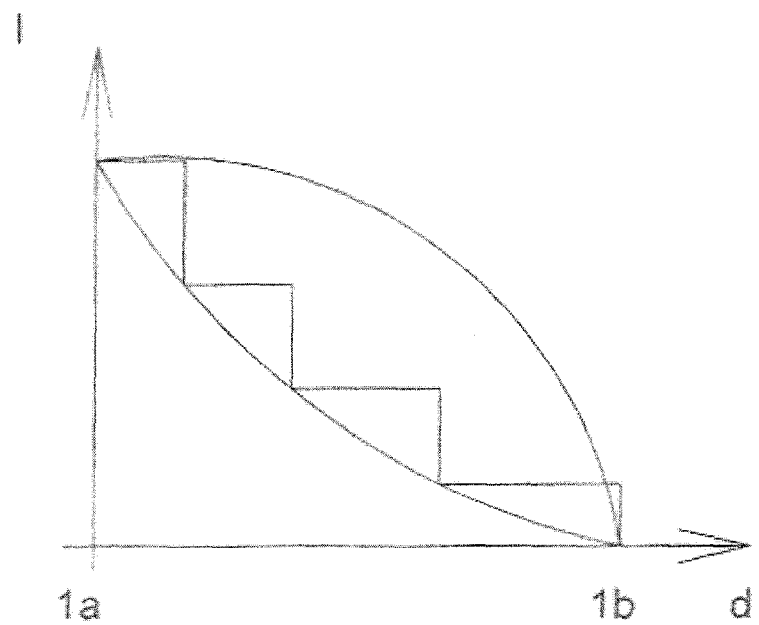
FIG. 2 shows possible longitudinal distributions of the glass fibers.

FIG. 2 shows three possible runs of the lengths of the glass fiber tubes 2. The length of the glass fiber tubes 2 is the greatest on the outer surface 1a of the hose 1. The length of the glass fiber tubes 2 is the smallest on the inner surface 1b of the hose.

In the intermediate area between the surfaces 1a, 1b of the hose 1, the longitudinal distribution of the glass fiber tubes 2 has an inhomogeneous, in particular monotonous, run. In this case, the longer glass fiber tubes 2 adjoin one of the two surfaces 1a, 1b, in particular the outer surface 1a, of the hose 1; the shorter glass fiber tubes 2 adjoin the respectively opposite surface, in particular the inner surface 1b. The distribution of the length of the glass fiber tubes 2 is inhomogeneous and in particular monotonous, i.e. the length 1 of the glass fiber tubes 2 increases in direction of the outer surface 1a, diminishes in direction of the inner surface 1b, on an imaginary line of intersection I-I (FIG. 3) between the outer surface 1a and the inner surface 1b.

An especially high accuracy of fit of the hose 1 on the pipe 11 is produced since the longer glass fiber tubes 2 in the outer region of the hose 1 counter shrinkage-related deformation forces of greater resistance than the shorter glass fiber tubes 2 inside the hose 1. Therefore, the material deformations occur predominantly inside the hose 1, however, the outer region of the hose is only subject to very slight deformations.

As the hardening-related deformations of the hose 1 are uniformly distributed over its volume in a homogeneous distribution of the lengths of the glass fiber tubes 2 and rejections or shrinkages can therefore also occur directly on the outer surface 1a of the hose 1, an exact fit of the hose 1 to the pipe 11 can not occur. In a hose 1 according to the invention, the region of the outer surface 1b of the hose 1 is subjected less strongly to deformation processes due to the longer glass fiber tubes 2, as a result of which a more accurate fit of the hose 1 to the pipe 11 can be obtained.

Figure 3:
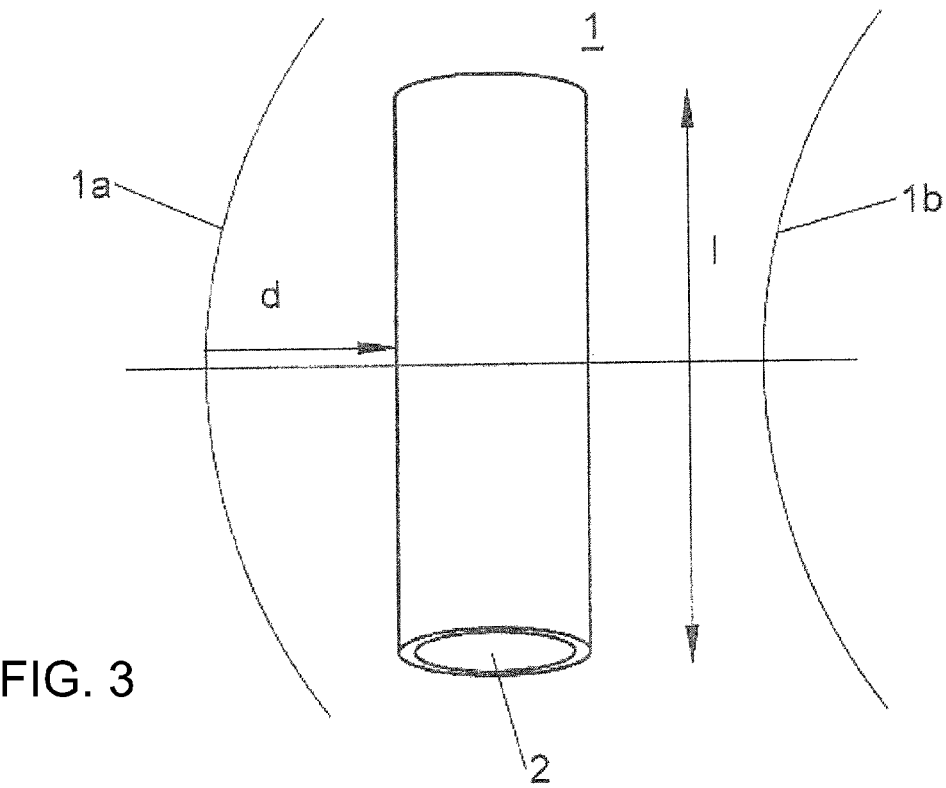
FIG. 3 schematically shows a small glass fiber tube 2 in the hose.

FIG. 3 schematically shows one of the glass fiber tubes 2 which are located in the hose 1. The length d designates the distance of the glass fiber tube 2 from the outer surface of the hose 1. The length 1 designates the length of the glass fiber tube 2.

Dependent on the production, various distributions of the lengths of the glass fiber tubes 2 can be obtained. However, it is essential that the length of the glass fiber tubes 2 has preset and different values on the two surfaces 1a, 1b of the hose 1, the length distribution of the glass fiber tubes 2 extending in an inhomogeneous and, in particular, monotonous manner in the region between the surfaces 1a and 1b of the hose 1. FIG. 2 shows three possible runs of the lengths of the glass fiber tubes 2, including a step-like, discontinuous run and two continual runs.

Figure 5:
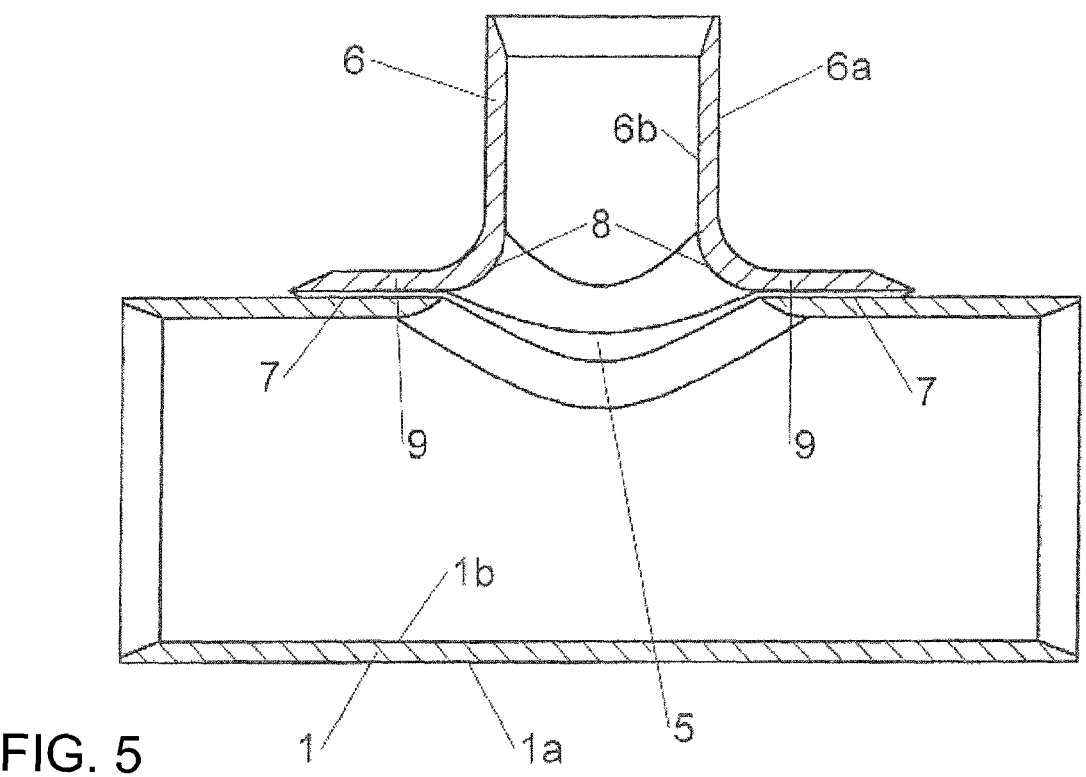
FIG. 5 shows a sectional view of a T-shaped pipe section.

FIG. 5 shows a scoop 6, namely a hose with a brim-shaped end region. In this case, at least one opening of the scoop 6 is expanded in its end region and has the form of a hat brim in this area of the expansion. A scoop 6 is especially suitable for producing the branching elements of a T-shaped or Y-shaped pipe insert. The end region 9 in which the scoop 6 has the brim-shaped expansion, can be adapted to the surface of the hose 1 due to its high elasticity and offers a tight seal between the hose 1 and the scoop 6.

Figure 4:
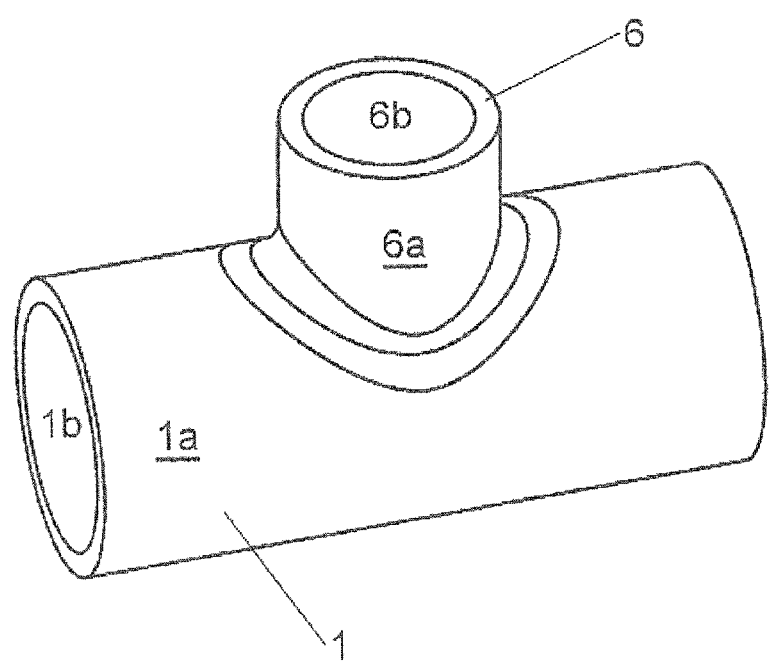
FIG. 4 shows a T-shaped pipe insert.
Figure 5A:
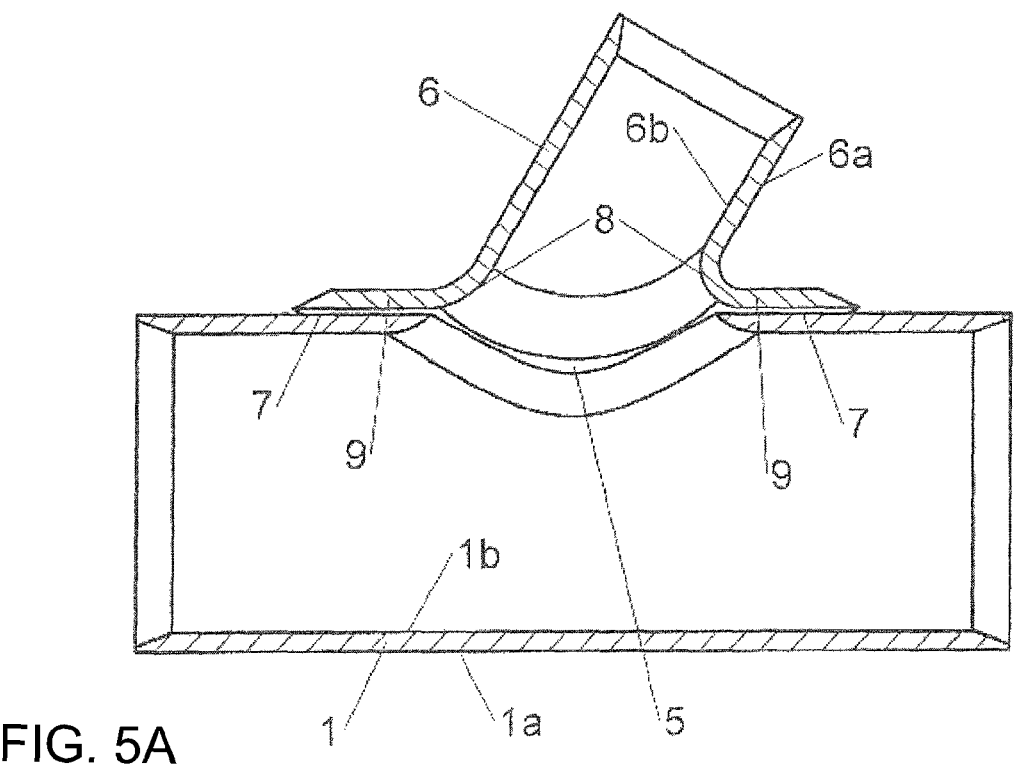
FIG. 5a shows a sectional view of a Y-shaped pipe section.

FIG. 4 shows a T-shaped pipe insert with a hose 1, out of which a part of the surface of the hose 1 is removed, and a scoop 6. A recess 5 is formed on the hose 1 by cutting or stamping. The scoop 6 is inserted into this recess 5 or placed against the outer surface 1b of the hose 1 so as to surround and sit closely against the recess, the brim-shaped part of the scoop 6 adjoining the inner or outer surface of the hose 1. Advantageously, it can be provided that the hose 1 and the scoop 6 are joined together by an adhesive. The recess 5 thereby has a form which is circular or ellipsoidal, seen from direction of the discharging scoop 6, or otherwise corresponds to the cross-sectional shape of the further hose 6. To facilitate the production of the hose 1 or scoop 6, it can be provided that the distribution of the lengths of the glass fiber tubes 2 in the hose 1 and scoop 6 is identical. A pipe insert 1 formed by means of a hose 1 and a scoop 6 can be used to seal damaged pipe pieces 32 in the region of a pipe branch. Although the pipe insert is a T-shaped piece, the hose 1 and scoop 6 being at a right angle to one another in their longitudinal expansion, Y-shaped pipe pieces can also be lined by means of a T-shape pipe insert of this type, as shown in FIGS. 5a and 6a. The pipe system hereby comprises a pipe 11 and a further pipe 16 which discharges into the pipe 11, in particular at a right angle.

FIG. 5 shows a sectional view of a T-shaped pipe insert. The end 9 of the scoop 6 inserted into the hose 1 is expanded in its radius or bent outward or offset and, with its inner surface 6b, adjoins the outer surface 1b of the hose 1. The end 9 of the scoop 6 adjoining the hose 1 is connected or glued to the hose 1 by means of a UV-hardening or thermosetting resin 7. The ends of the scoop 6 or the edge of the recess 5 are rounded in this case, whereby the thickness of the casing of the hose 1 and the scoop 6 gradually diminishes.

A further embodiment of the pipe insert lies in that a part of the casing of the hose 1 is removed and a scoop 6 is glued, in particular with a thermosetting resin 7, from the outside, on or about the recess 5 thus produced so as to be flush. The recess 5 is thereby formed in such a way that its edging corresponds to the intersecting plane of two circular cylinders which are, in particular, normally stacked on top of one another, preferably with intersecting cylinder axes. An embodiment of this type can be used in a similar manner to the pipe insert shown in FIG. 5. In this case, the outer surface 1a of the hose 1 adjoins the inner surface 6b of the scoop 6.

In this case, the inner surface 6b of the scoop 6 is glued together with the outer surface 1a of the hose 1.

Figure 6:
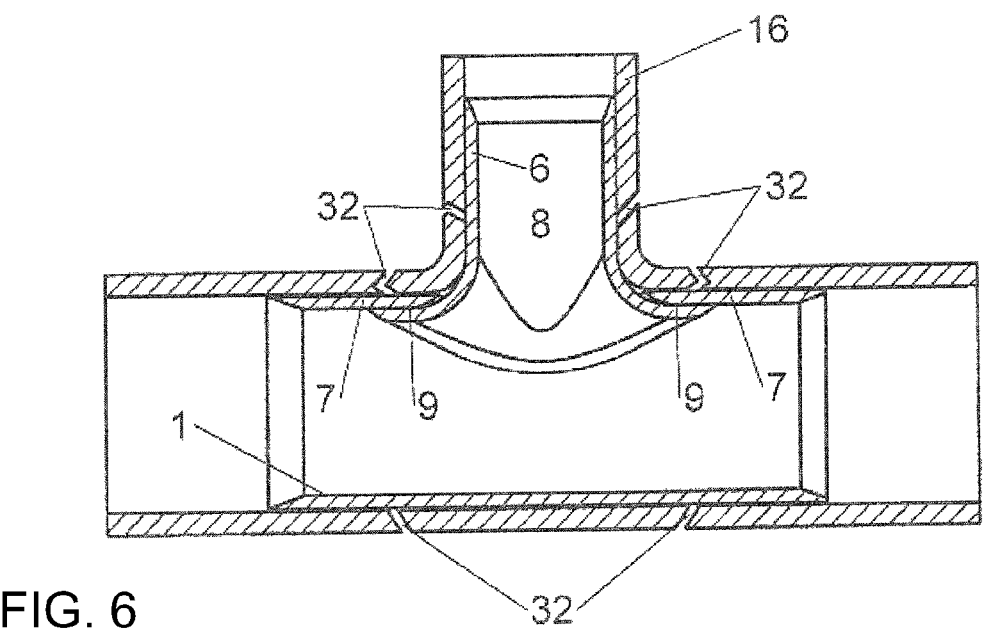
FIG. 6 schematically shows a T-shaped hose inserted into a T-shaped pipe piece.
Figure 6A:
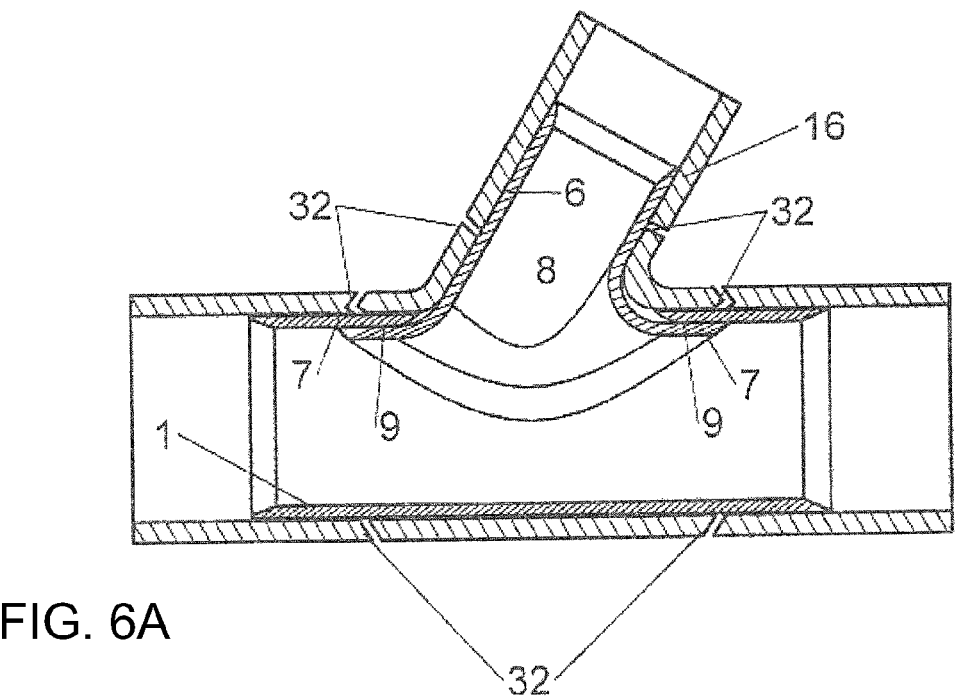
FIG. 6a schematically shows a T-shaped hose inserted into a Y-shaped pipe piece.

FIG. 6 shows a sectional view of a T-shaped pipe insert which is inserted into a T-shaped pipe section. The T-shaped pipe section thereby comprises a pipe 11 into which a further pipe 16 discharges at a right angle. This pipe section has several damaged spots 32 on the pipe 11 and on the further pipe 16. Furthermore, the T-shaped pipe insert is inserted into the T-shaped pipe section, wherein the scoop 6 is inserted into the further pipe 16 and the hose 1 is inserted into the pipe 1. The outer surface 6a of the scoop 6 is placed against the inner surface of the further pipe 16. The outer surface 6a of the scoop 6, on which the longer glass fiber tubes 2 are arranged, faces the further pipe 16. Thermosetting resin 7 is inserted and hardened in the space between the hose 1 and the scoop 6. Advantageously, the scoop 6 has a greater thickness in the area 8 of its curvature, preferably twice the thickness relative to the wall thickness in the end region of the scoop 6, since especially great mechanical stresses act on the pipe insert inserted into the pipe 11 or the further pipe 16 in the region of discharge of the further pipe 16 into the pipe 11.

A sectional view of a Y-shaped pipe insert is shown in FIG. 5a. A sectional view of a Y-shaped pipe section with an inserted pipe insert is shown in FIG. 6a. The fundamental differences between FIG. 5 and FIG. 5a or FIG. 6 and FIG. 6a are in the angle of the scoop 6 and hose 1 to one another. Due to the high flexibility of the material forming the scoop 6 and the hose 1, a single, in particular T-shaped, pipe insert can be used for any angle desired.

Unless otherwise noted, the following dimensionings apply both to the hose 1 and the scoop 6.

Especially good hardening properties are produced when the wall thickness or the thickness of the hose 1 or the scoop 6 is in the range of 0.5% to 5% of the diameter of the hose 1. The quick hardening of the resin 3 forming the pipe insert 1 and a high accuracy of fit of the hose 1 as well as the scoop 6 on the pipe 11 or pipe 16 is obtained within this range.

To obtain an especially torsionally stable surface of the outer surface of the hose 1 or scoop 6, the lengths of the glass fiber tubes 2 are selected in a range of 1 to 10 cm. To attain a quick hardening of the resin 3, the thickness of the casing of the hose 1 or scoop 6 is selected in the range of between 0.5 to 0.8 cm.

With larger pipe diameters or hose diameters, other dimensionings are required for reasons of stability or tightness of the pipe insert at the respective damaged spots 31, 32. If the diameter of the hose 1 or scoop 6 is more than a meter, then the thickness of the hose 1 can be up to 5% of the diameter of the hose 1 or scoop 6. Furthermore, the length of the glass fiber tubes 2 can be adapted to the diameter of the hose 1 to increase its stability, especially with large diameters. In this case, the lengths of the glass fiber tubes 2 can be selected in the range of 2% to 5%, preferably 3% to 3.5%, of the diameter of the hose 1. To obtain an especially high torsional rigidity, an especially large ratio of the length of the glass fiber tubes 2 on the two opposite surfaces 1a, 1b of the hose 1 is required. However, to facilitate insertion of the hose 1 in the pipe region and to make the pressing process easily feasible, it is advantageous not to select the ratio of the lengths of the glass fiber tubes 2 too large on the two opposite surfaces 1a, 1b of the hose 1. Ratios of between 1:4 and 1:2 or 2:1 to 4:1 result for practical applications. The longer glass fiber tubes 2 are each arranged on the outer surface 1a.

If a scoop 6 is attached to a hose 1, then they form a common surface or outer wall of a pipe insert. The length distribution of the glass fiber tubes 2 of the hose 1 and scoop 6 can preferably be selected equally. The hose 1 and the scoop 6 are joined together such that the surface areas with the respective longer glass fiber tubes 2 form a common surface and that those surface areas on which shorter glass fiber tubes 2 adjoin form the inner surface area.

To obtain an especially high stability and flexibility, the glass fiber tubes 2 are embedded in the resin 3 in an unorganized manner, so that, although they are formed or arranged almost parallel to the surfaces 1a, 1b, 6a, 6b of the hose 1 or scoop 6, the arrangement or alignment and reciprocal position of the glass fiber tubes 2 can be as desired within this surface. The angle of inclination of the glass fiber tubes 2 vis-à-vis the surfaces 1a, 1b, 6a, 6b is thereby preferably less than 10°. To improve the overall stability of the hose 1, it is advantageous to distribute the mass portion or volume portion of the glass fiber tubes 2 homogeneously in the hose 1 and only vary the length of the individual glass fiber tubes 2.

The hose 1 or pipe insert is usually inserted by means of a robot which conveys the pipe insert in the pipe 11 up to the damaged spot 31 and then exerts pressure on the pipe insert, in particular by inflating a balloon, from the inside and presses against the inner wall of the pipe 11. Prior to insertion, the scoop 6 is pushed into the pipe insert or hose 1 to reduce the resistance. The end region of the scoop 6 distant from the hose 1 is thereby passed through the scoop 6 and inserted into the hose 1 through the recess 5. Proceeding in this manner is also called inverting of the pipe insert. This step is omitted when inserting a hose 1 without a superimposed scoop 6. Due to the reduced space requirement of the pipe insert, the frictional resistance of the pipe insert is clearly reduced which substantially simplifies the insertion.

To insert the pipe insert into the pipe 11, a robot is commonly use. This robot has a unit for moving along the pipe 11, a unit for fixing in position and conveying the pipe insert, an image recording unit or camera, a pressure-exerting unit and a UV radiator. Furthermore, the robot is remote-controlled and delivers the data recorded by means of the camera to an external remote control outside of the pipe 1. The pipe insert is shifted in the pipe 11 until the final position of the pipe insert is found. The exact locating of the destination of the pipe insert is made possible by means of the camera.

Once the destination in the pipe has been reached, a pressure-exerting unit is started which firmly presses the not-as-yet hardened pipe insert together with the pipe 11, optionally with the further discharging pipe 16. The UV radiator is then switched on, as a result of which the pipe insert is hardened, that surface of the pipe insert, hose 1 and scoop 6 being held adjacent to the inner side of the respective pipe at which the longer glass fiber tubes are situated.

Radiating with UV light causes the resin 3 forming the hose 1 to harden. If the pressure-exerting unit is in the form of a balloon, then this balloon is formed from a material transparent to UV. In this way, UV light can act on the pipe insert through the balloon. Furthermore, an additional light source for visible light can be arranged on the robot for illuminating the image region to be recorded by the camera.

With the design of the hose 1, scoop 6 or pipe insert according to the invention, a high accuracy of fit is obtained and mechanical distortions prevented during hardening.

The invention claimed is:

1. A hose, comprising:
   a tubular casing formed with a resin and having two surfaces, including an inner hose surface and an outer hose surface;
   cut-to-length glass fiber tubelets embedded in said resin forming the hose; and
   said glass fiber tubelets having a length dimension with values at said two surfaces of the hose that are preset and different from one another.

2. The hose according to claim 1, wherein said resin is a UV-hardenable resin.

3. The hose according to claim 1, wherein said resin is a UV-hardenable resin selected from the group consisting of vinyl ester and polyester.

4. The hose according to claim 1, wherein a length distribution of said glass fiber tubelets in a space between said two surfaces of the hose has an inhomogeneous run.

5. The hose according to claim 1, wherein a length distribution of said glass fiber tubelets in a space between said two surfaces of the hose varies monotonously.

6. The hose according to claim 1, wherein said tubular casing of the hose has a uniform thickness over at least one of a periphery thereof and a longitudinal extent thereof.

7. The hose according to claim 1, wherein said glass fiber tubes in a vicinity of said outer surface are longer than in a vicinity of said inner surface.

8. The hose according to claim 1, wherein the hose is integrally formed of one piece.

9. The hose according to claim 1, wherein the hose is formed with rounded sealing edges and/or a thickness of said casing of the hose diminishes on at least one end or in an end edge region.

10. The hose according to claim 1, wherein said resin forming the hose is partially hardened and has a rubber-like consistency.

11. The hose according to claim 1, wherein said resin forming the hose is expandable and the hose can be expanded up to 170% of an original size thereof.

12. The hose according to claim 1, formed into a connecting piece with at least one opening of the tubular casing being expanded and the expanded area having the form of a hat brim or an outward expansion.

13. A pipe insert, comprising:
   a hose according to claim 1;
   a scoop connected with said hose;
   said scoop having a brim-shaped part adjoining said outer surface or said inner surface of said hose and a tubular part extending at a preset angle from said hose; and
   said hose having a cutout formed therein surrounded by a contact area between said scoop and said hose and communicating with an opening of said scoop.

14. The pipe insert according to claim 13, wherein said brim-shaped part contacts said hose over an entire surface and/or to a large extent edge-free and smooth, and wherein said tubular part of said scoop projects at a right angle from said hose.

15. The pipe insert according to claim 13, wherein:
   a radially expanded end region of said scoop is in contact with said hose, and
   said radially expanded end region of the scoop is connected to said hose or glued to said hose.

16. The pipe insert according to claim 15, wherein an outer surface of said brim-shaped part of said scoop is in contact with said inner surface of said hose.

17. The pipe insert according to claim 15, which comprises a resin attaching said radially expanded end region of the scoop to said hose.

18. The pipe insert according to claim 17, wherein said resin is a thermosetting resin.

19. The pipe insert according to claim 13, wherein end sections of walls of said scoop, or marginal borders of said cutout of said hose, have a diminishing wall thickness or a thickness thereof is reduced at the end region, so that the surface walls of the pipe insert extend in a substantially smooth and elevation-free manner.

20. The pipe insert according to claim 13, wherein the respective said surface of said hose at which the shorter glass fiber tubelets are disposed is connected in contact with the respective surface of said scoop at which the longer glass fiber tubes are disposed.

21. The pipe insert according to claim 13, wherein a surface of said hose on which the longer said glass fiber tubelets are arranged is connected or brought into contact with a surface of said scoop on which the shorter said glass fiber tubelets are arranged.

22. The pipe insert according to claim 13, wherein at least one of the following holds true:
   a length of said glass fiber tubelets on an inner side of said scoop corresponds to a length of said glass fiber tubelets on an inner said of said hose; and
   a length of said glass fiber tubelets on an outer side or outer surface of said scoop corresponds to a length of said glass fiber tubelets on an outer side of said hose.

23. The pipe insert according to claim 13, wherein a distribution of the lengths of said glass fiber tubelets are selected equally in said hose and in said scoop.

24. The pipe insert according to claim 13, wherein at least one of said hose and said scoop, in an area of a curvature, wherein a radius of curvature is in a range of two to five times a thickness of the wall of said scoop and/or has a maximum 50% enlarged wall thickness in a connecting area or in an attachment area of the scoop in said hose and/or adjoining said hose.

25. The pipe insert according to claim 13, wherein a wall thickness of said hose or said scoop is in a range of 0.5% to 5% of an outer diameter of said hose or said scoop.

26. The pipe insert according to claim 13, wherein a wall thickness of said hose or said scoop is in a range of 1% to 3% of an outer diameter of said hose or said scoop.

27. The pipe insert according to claim 13, wherein a length of said glass fiber tubelets is in the range of 1 to 10 cm and/or a wall thickness of the wall of said hose and/or said scoop is in a range of between 0.5 to 0.8 cm.

28. The pipe insert according to claim 27, wherein the wall thickness of the wall of said hose and/or said scoop is in a range of between 0.6 to 0.7 cm.

29. The pipe insert according to claim 13, wherein a length of said glass fiber tubelets is in a range of 2% to 5% of an outside diameter of said hose.

30. The pipe insert according to claim 13, wherein the length of said glass fiber tubelets is in a range of 3% to 3.5% of the outside diameter of said hose.

31. The pipe insert according to claim 13, wherein a ratio of the lengths of said glass fiber tubelets on two opposite surfaces of said hose and/or said scoop is between 1:4 and 1:2, with the longer glass fiber tubelets being disposed on the outer surface.

32. The pipe insert according to claim 13, wherein a ratio of the lengths of said glass fiber tubelets on two opposite surfaces of said hose and/or said scoop is between 2:1 to 4:1.

33. The pipe insert according to claim 13, wherein the glass fiber tubelets are placed or arranged substantially parallel to the surfaces of said hose or scoop.

34. The pipe insert according to claim 13, wherein an average angle of inclination of said glass fiber tubelets is less than 10° relative to a closest areas of the surface.

35. The pipe insert according to claim 13, wherein said glass fiber tubelets are disposed in an unorganized manner or crisscross to one another.

36. The pipe insert according to claim 13, wherein a mass portion and/or a volume portion of said glass fiber tubelets in said hose and/or in said scoop are of equal size.

37. The pipe insert according to claim 13, wherein a mass portion and/or volume portion of said glass fiber tubelets in said hose and/or in said scoop are distributed homogeneously.

38. The pipe insert according to claim 13, wherein said hose and said scoop are formed with UV hardenable resin.

39. A pipe assembly, comprising:
a pipe having an inner surface;
a hose, a scoop, or a pipe insert according to claim 13 disposed in said pipe;
wherein an outer surface of said hose adjoins said inner surface of said pipe in a flush relationship; and
wherein relatively longer said glass fiber tubelets are disposed on the outer surface of said hose.

40. The pipe assembly according to claim 39, which further comprises a pipe branch with a further pipe opening into said pipe;
wherein said scoop is inserted into said further pipe, with said brim-shaped section of said scoop remaining in said pipe;
wherein said outer surface of said scoop adjoins an inner surface of said further pipe; and
wherein said further pipe faces that surface of the scoop on which the relatively longer said glass fiber tubelets are arranged.

41. A method of inserting a pipe insert into a discharge region of a pipe assembly where a further pipe opens into a first pipe, the method which comprises:
providing a pipe insert according to claim 13;
leading in, pushing in, or inverting an end area of the scoop distal from the hose through the scoop and opening into the hose;
shifting or leading the pipe insert through the pipe and bringing the pipe insert into the discharge area of the two pipes, with the recess coming to lie in an area of the discharge of the further pipe into the first pipe;
pressing the pipe insert against the first pipe from an inside with uniform pressure, with a surface of the hose adjoining the first pipe having the longer glass fiber tubelets;
turning the end area of the scoop distal from the hose out of the hose through the opening and the scoop and pressing the scoop from the inside against the further pipe, with that surface of the scoop adjoining the further pipe having the longer glass fiber tubelets; and
hardening the pipe insert by way of UV light while maintaining the pressure and connecting the pipe insert with the two pipes.

42. The method according to claim 41, which comprises subjecting the hose, the scoop, or the pipe insert to pressure by way of a balloon transparent to UV light, the balloon at least partially adjoining the first pipe and at least partially adjoining the further pipe.

43. The method according to claim 42, which comprises providing a balloon having a T-shape.

* * * * *